Aug. 30, 1932.  J. H. WAGENHORST  1,874,394
VEHICLE WHEEL
Filed June 22, 1928   2 Sheets-Sheet 1

INVENTOR.
James H. Wagenhorst
BY Church & Church
His ATTORNEYS

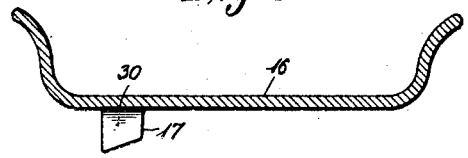
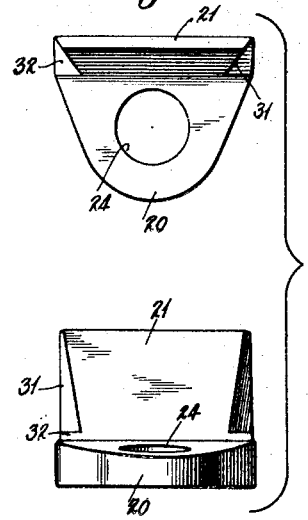
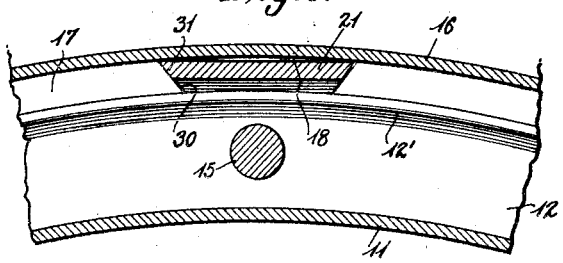
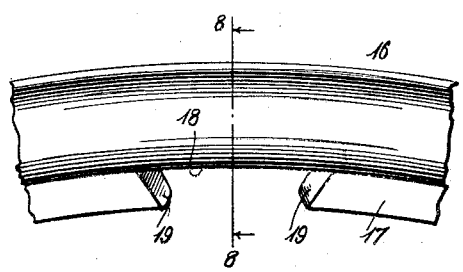
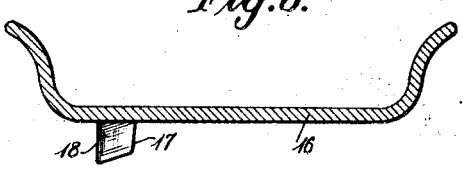
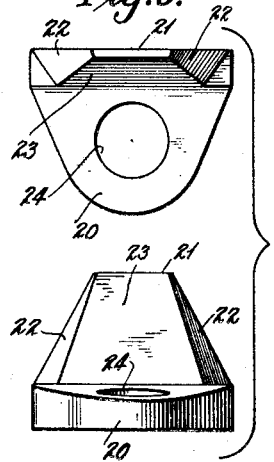
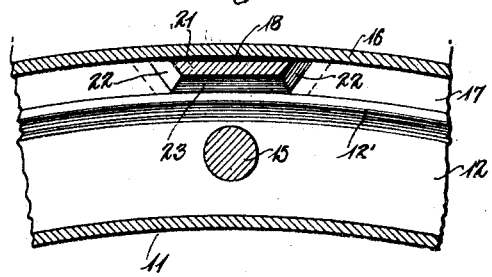

Patented Aug. 30, 1932

1,874,394

UNITED STATES PATENT OFFICE

JAMES H. WAGENHORST, OF JACKSON, MICHIGAN

VEHICLE WHEEL

Application filed June 22, 1928. Serial No. 287,427.

My invention relates to improvements in vehicle wheels and has to do, more particularly, with automobile wheels having demountable rims and the means for detachably securing such rims in seated position upon the felly of the wheel.

The chief object of my invention is to provide a demountable rim of the attached lug type in which the securing lugs are rigidly attached to the rim in a cheaper and more economical manner than in structures of that type heretofore known. An object of my invention is to provide a demountable rim of the attached lug type which, while having all the advantages of attached lug rims heretofore known and used, is less expensive to manufacture and requires less material.

A further object of my invention is to provide a demountable rim which is held seated on the felly of the wheel by loose or separable clamps or lugs so constructed and cooperating with the demountable rim as to have all of the advantages of attached lugs.

A further object of my invention is to provide securing clamps or lugs so cooperating with the demountable rim as to force the rim to its seat on the felly and hold it there, to transmit drive or torque from wheel to rim, and to bind the rim to the felly, removing distortions in the rim and causing it to conform to the felly. A further object of my invention is to provide a demountable rim, having a radially inwardly-projecting rib in which a series of transverse notches are formed with undercut end walls, and securing lugs having tongues extending into said notches with their edges engaging said undercut end walls.

Further objects, and objects relating to details and economies of construction and operation will definitely appear from the detailed description to follow. In one instance, I accomplish the objects of my invention by the devices and means set forth in the following specification. My invention is clearly defined in the appended claims. A structure constituting a preferred embodiment of my invention is illustrated in the accompanying drawings, forming a part of this specification, in which:

Fig. 4 is a detail sectional view of the rim taken on the line 4—4 of Fig. 3;

Fig. 5 is a view in end elevation and bottom plan of one of the securing lugs;

Fig. 6 is a detail sectional view through the felly and the rim taken on the line 6—6 of Fig. 2;

Fig. 7 is a view in elevation of a portion of a rim having a slightly modified form of notch;

Fig. 8 is a detail sectional view taken on the line 8—8 of Fig. 7;

Fig. 9 is a view in end elevation and bottom plan of the securing lug which is adapted to cooperate with the form of notch shown in Fig. 7 and Fig. 10 is a view corresponding to Fig. 6 but showing the notch and lug of the form shown in Figs. 7 and 9.

In the drawings, the same reference numerals refer to the same parts throughout the several views and the sectional views are taken looking in the direction of the arrows at the ends of the section lines.

Figure 1:
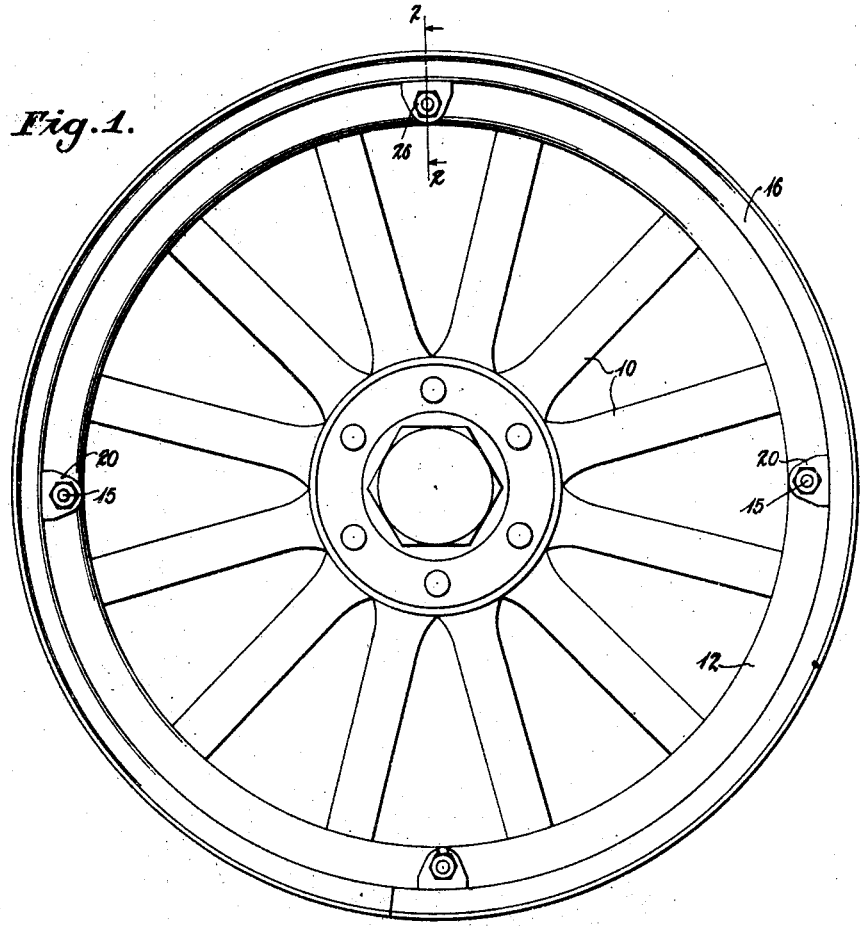
Figure 1 is a view in elevation of a wheel and rim embodying my invention.
Figure 2:
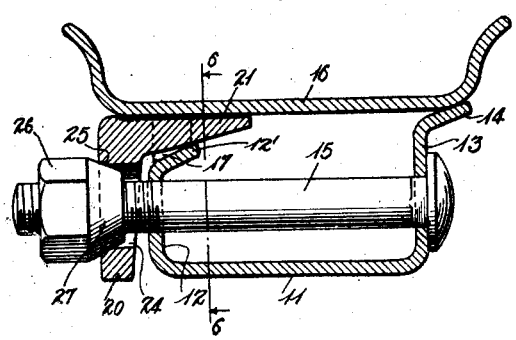
Fig. 2 is a sectional view through the felly and rim taken on the line 2—2 of Fig. 1.

In general, I accomplish the objects of my invention by providing a demountable rim having an integral longitudinal rib extending radially inwardly from the base thereof. This rib has a plurality of transverse undercut notches formed therein constituting dovetailed mortices which receive the complementary dovetailed tongue portions of the securing lugs. In accordance with the preferred form of my invention, the undercut end walls are straight from front to rear and receive the beveled edges of the laterally projecting tongues of the securing lugs, which are forced into the notches with a press fit so that they are thus, to all intents and purposes, rigidly attached to the demountable rim. I propose, however, to embody this same principle in a demountable rim which employs loose or separable lugs and, in such case, the end walls of the notches are not only undercut but are tapered and converge from front to rear and the tongues on the securing lugs are correspondingly tapered and fit within the notches.

Referring to the numbered parts of the drawings, I have shown a wheel body comprising a plurality of spokes 10 mounted on the usual hub and carrying at their extremities a felly of the metal channel type having a base 11, a front leg 12, and a rear leg 13 provided with a beveled flange 14 on which the demountable rim 16 seats. A plurality of securing bolts 15 are carried by this felly, extending through the front and rear legs thereof and projecting from the front leg. The demountable rim 16 is provided with a radially inwardly-projecting integral rib 17, which is located near the front side of the rim base. The rib has a beveled inner surface seating on a beveled flange 12' on the front leg 12.

Figure 3:
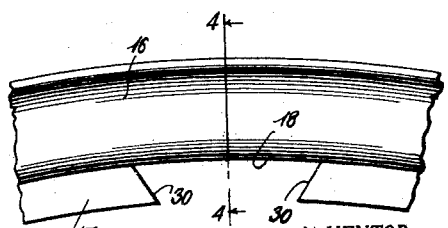
Fig. 3 is a view, in side elevation, of a portion of the demountable rim showing one of the notches for receiving the rim securing lugs.

This rib is preferably of the type that is rolled in the stock from which the rim is made, at the rolling mill, and is known as a "hot-rolled" rib. A plurality of notches 18 are cut in this rib located in correspondence with the securing bolts that are carried by the felly. Referring to Fig. 3, it will be seen that the end walls 30 of these notches are undercut and diverge from the inner edge of the rib to the base of the rim. A plurality of securing lugs are provided, each of which has a vertical portion 20 and a laterally-extending tongue 21. The tongue 21 has its edges beveled, as at 31, so as to fit the undercut end walls of the notches 18, and shoulders 32 are provided on the securing lug on either side of the tongue 21. In practice, the tongue 21 of the securing lug 20 is forced into one of the notches 18 in the rib 17 with the beveled edges 31 engaging the undercut end walls 30 of the notch and the shoulders 32 engaging the front face of the rib. The lug may thus be forced into position by a suitable press, making a tight or force fit so that, to all intents and purposes, the lug is rigidly attached to the rim and will not be separated therefrom under ordinary conditions of use. The forward end of the securing bolt 15 extends through a bolt hole 24 having a countersink 25 formed in the portion 20 of the lug. The bolt hole is of somewhat greater diameter than the bolt so as to provide a clearance around the bolt. Nuts 26 are screwed on the forward ends of the bolts and provided with conical portions 27 which engage the conical countersinks 25.

Referring to Figs. 7, 8, 9 and 10, I have shown a modified form of my invention in which the securing lugs are loose or separable from the demountable rim. In this construction, the end walls 19 of the notches 18 are not only undercut but also tapered from front to rear, as shown in Fig. 7. The securing lug 20 has a laterally extending tongue 21 provided with tapered and beveled edge portions 22, and a tapered portion 23. This tongue of the clamp fits in the notch 18, and the edge portions 22 engage the undercut and beveled end walls 19 of the corresponding notch. The end of the securing bolt 15 extends through the countersunk bolt hole 24 and a nut 26, screwed on the end of the bolt and provided with a conical portion 27 engaging the countersink 25, forces the securing lug laterally until the beveled portions 22 engage firmly the undercut and beveled end walls 19 of the notch, and thus the lugs force the demountable rim 16 to its seat on the flanges of the felly.

The preferred embodiment of my invention constitutes an attached lug rim, which can be manufactured very cheaply and is economical of material but has all the advantages of the attached lug rims heretofore made and used. The notches with the undercut end walls can be readily formed in the hot-rolled rib of the rim by a punching operation. The securing lugs can be punched from an angle bar and the beveled portions of the tongue can readily be formed in a press. To secure these lugs to the demountable rim nothing is required except to press the tongues of the lugs into position in the notches of the rim and this can be very quickly and cheaply done. When the lugs are pressed into the notches in the rib of the demountable rim, they are rigidly attached to the rim and are fully as effective as the attached lug rims now on the market. These can be made, however, more economically than rim structures heretofore known and used.

In so far as the loose or separable lugs shown are concerned, these have all the advantages of the attached lug rim, in that the lugs provided with the tongues having beveled side edges cooperate with the beveled and undercut end walls of the corresponding notches in the rib of the demountable rim, so that these lugs force the rim to its seat on the felly and hold it there, transmit drive from felly to rim and, at the same time, serve to bind the rim securely to the felly so that, in case there is any distortion of the rim, these lugs will serve to remove the distortion and to cause the rim to conform to the circular shape of the felly on which it is mounted.

I am aware that the rim structures shown in this application may be changed considerably without departing from the spirit of my invention and, therefore, I claim my invention broadly as indicated by the appended claims.

What I claim is:

1. A demountable rim having an integral rib projecting radially inwardly from the base of the rim, said rib having a plurality of transverse notches formed therein with undercut end walls and affording a seat for the rim between said notches, and a plurality of securing lugs having tongues fitting in said notches and provided with side edges engaging the undercut end walls, said lugs being pressed into position in said notches to attach the lugs to the rim.

2. The combination of a fixed rim, a demountable rim seated thereon and provided with an integral rib projecting radially inwardly from the front of the rim base, said rib having a plurality of transverse notches formed therein with undercut end walls tapered from front to rear and affording a seat for the front of the rim between said notches, a plurality of separable clamps each having a tapered tongue disposed in one of said notches with beveled side edges engaging the undercut end walls of the notch, said clamps each having a radially inwardly extending portion provided with a bolt hole, securing bolts carried by the fixed rim with their forward ends extending through said bolt holes, and nuts screwed on said bolts and engaging said clamps.

3. The combination of a fixed rim, a demountable rim seated thereon and provided with an integral rib projecting radially inwardly from the rim base, said rib having a plurality of transverse notches formed therein with undercut end walls and affording a seat for the rim between said notches, a plurality of securing lugs each having a tongue disposed in one of said notches with its side edges engaging the undercut end walls of the notch, said lugs each having a radially inwardly extending portion provided with a bolt hole, securing bolts carried by the fixed rim with their forward ends extending through said bolt holes, and nuts screwed on said bolts and engaging said lugs.

4. A demountable rim having an integral annular rib projecting radially inwardly from the rim base, transversely notched at spaced intervals to provide mortices of dovetail form, the walls of each of which converge radially inwardly, said mortices being adapted to receive the dovetailed tongues of rim securing lugs.

5. A demountable rim having an integral longitudinal rib projecting radially inwardly from the rim base, said rib having a plurality of undercut transverse notches constituting mortices of dovetail form, and lugs for securing the rim to a wheel, said lugs having tongues complementary to said notches and constituting dovetailed tenons engaged therein.

6. A demountable rim having an integral annular rib projecting radially inwardly from the rim base, a plurality of undercut transverse notches constituting mortices of dovetail form, and lugs for securing the rim to a wheel, said lugs having dovetailed tongues pressed into engagement with said notched rib and interlocked against both relative circumferential and relative radial movement.

7. A demountable rim having its base formed with a radially inwardly projecting integral annular rib transversely notched at spaced intervals to provide mortices of dovetail form, each mortice being characterized in that its walls converge from front to rear in addition to their convergence radially inwardly, and a plurality of lugs for securing the rim to a wheel, said lugs being provided with tenons each of which is complementary to and snugly engageable in a mortice in said rib.

JAMES H. WAGENHORST.